United States Patent [19]

Andre

[11] Patent Number: 4,854,790

[45] Date of Patent: Aug. 8, 1989

[54] VEHICLE WHEEL SUPPORT AND FASTENING DEVICE

[75] Inventor: Jean-luc Andre, Dangolsheim, France

[73] Assignee: Lohr Industrie, Hangenbieten, France

[21] Appl. No.: 145,619

[22] Filed: Jan. 19, 1988

[30] Foreign Application Priority Data

Jan. 16, 1987 [FR] France ............................ 87 00816

[51] Int. Cl.⁴ ............................................. B60P 3/07
[52] U.S. Cl. ........................................ 410/30; 410/9; 410/19
[58] Field of Search ............................ 410/3, 4, 7–9, 410/19, 21, 30, 47, 49, 66

[56] References Cited

U.S. PATENT DOCUMENTS

| 2,838,338 | 6/1958 | Kerley et al. | 410/28.1 |
| 4,668,142 | 5/1987 | Fity et al. | 410/8 X |
| 4,674,929 | 6/1987 | Blunden | 410/30 |
| 4,682,922 | 6/1987 | Andre et al. | 410/9 X |
| 4,693,650 | 9/1987 | Smith | 410/30 X |

FOREIGN PATENT DOCUMENTS 2584664  1/1987  France ................................ 410/19

Primary Examiner—Robert B. Reeves
Assistant Examiner—Joseph D. Pape
Attorney, Agent, or Firm—Schwartz & Weinrieb

[57] ABSTRACT

A support arm assembly for supporting vehicles by their wheels, upon, for example, vehicle transported vehicles includes a pair of support arms (2) each of which is pivotably movable between a retracted, inoperative position disposed parallel to a supporting profile (4) and an extended operative position disposed perpendicular to the profile (4). Each assembly includes a mounting bracket (3) which is lockingly engaged with an upper surface of the profile (4), and each arm (2) is pivotably mounted within the mounting bracket (3) by its shaft (15). The upper portion of the shaft (15) includes an integral stop member (16) which abuts oppositely disposed wing portions (22,23) of the mounting brackets (3) so as to define the retracted and extended positions of the support arms (2). The wing portions (22,23) of the mounting brackets (3) include inclined thrust surfaces (27,28) which cause the mounting arms (2), as a result of the interaction between the stop members (16) and the thrust surfaces (27,28), to assume pivoted positions extending toward the retracted position but during the operative support position. In this manner, under such load conditions, the support arms (2) forcefully engage opposite side surfaces of the vehicle wheel tires so as to effectively support and restrain the vehicle.

14 Claims, 4 Drawing Sheets

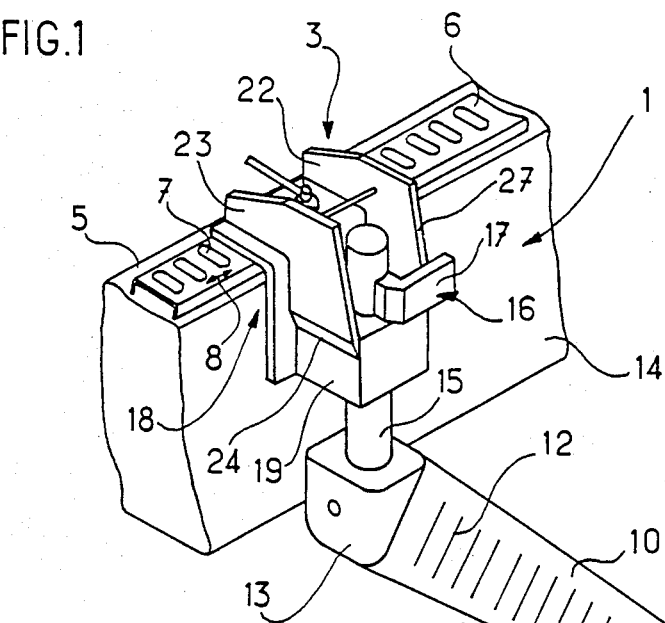
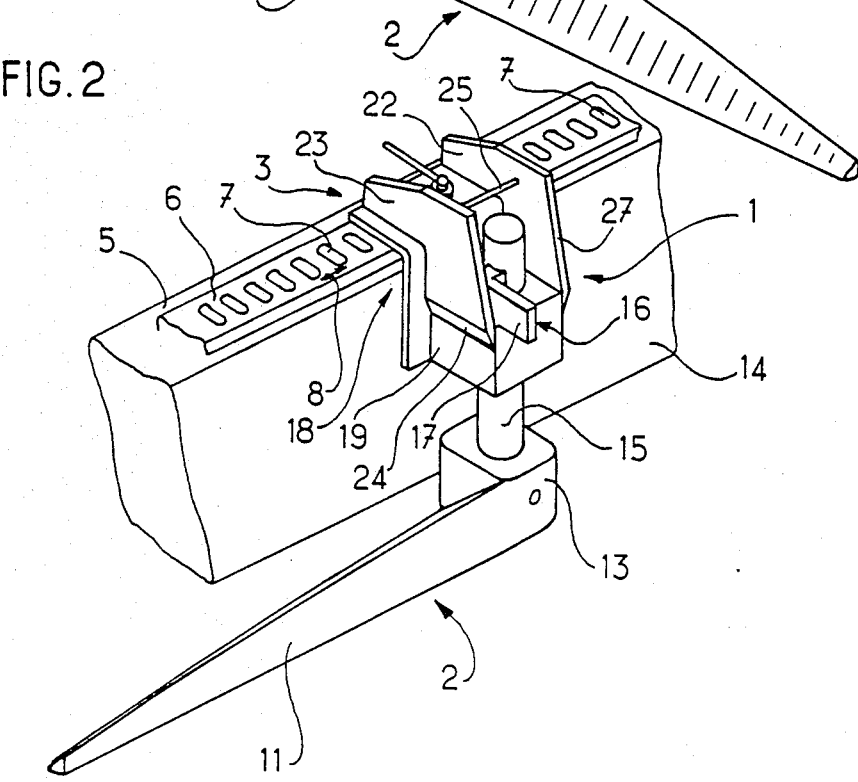

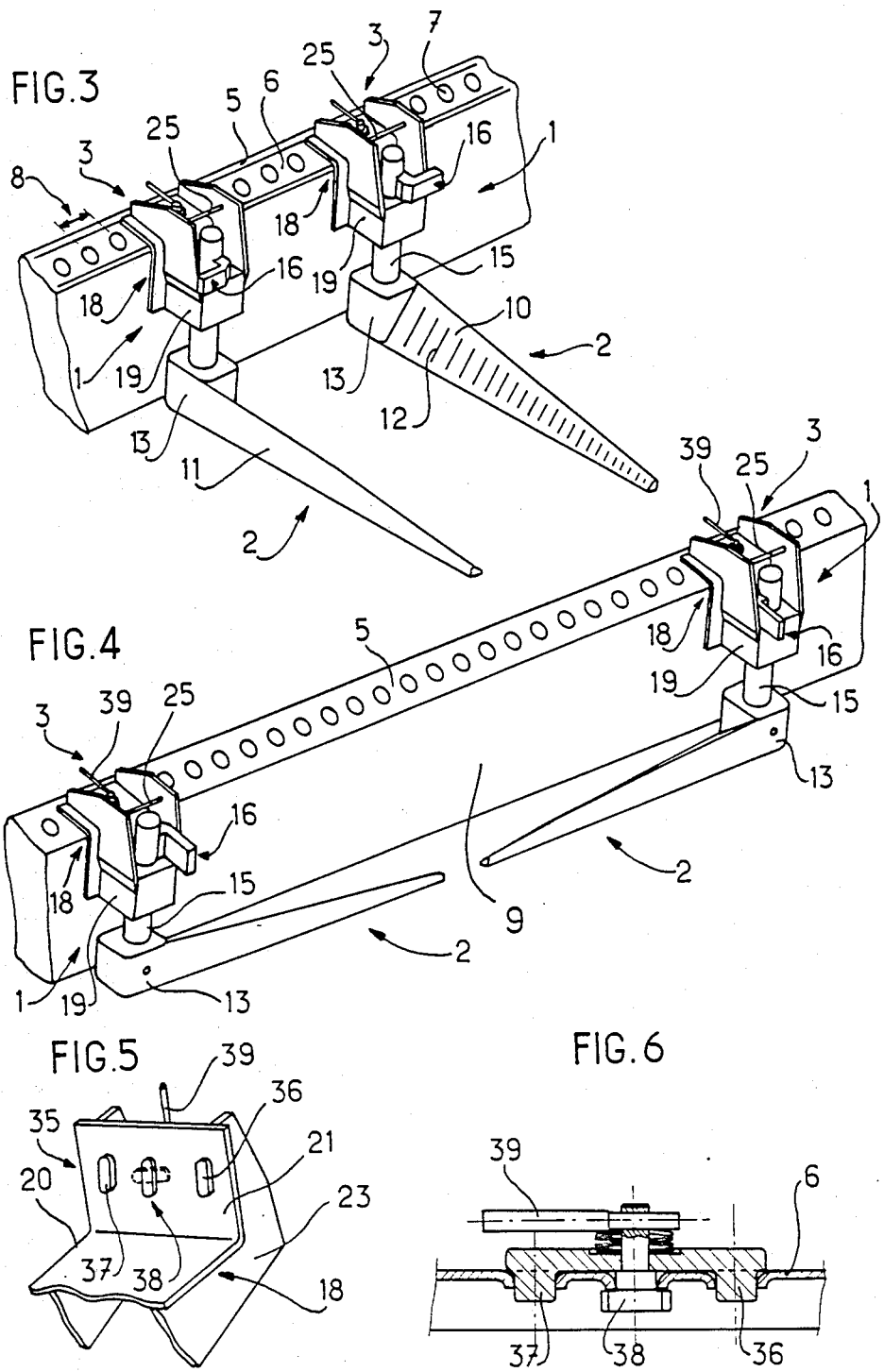

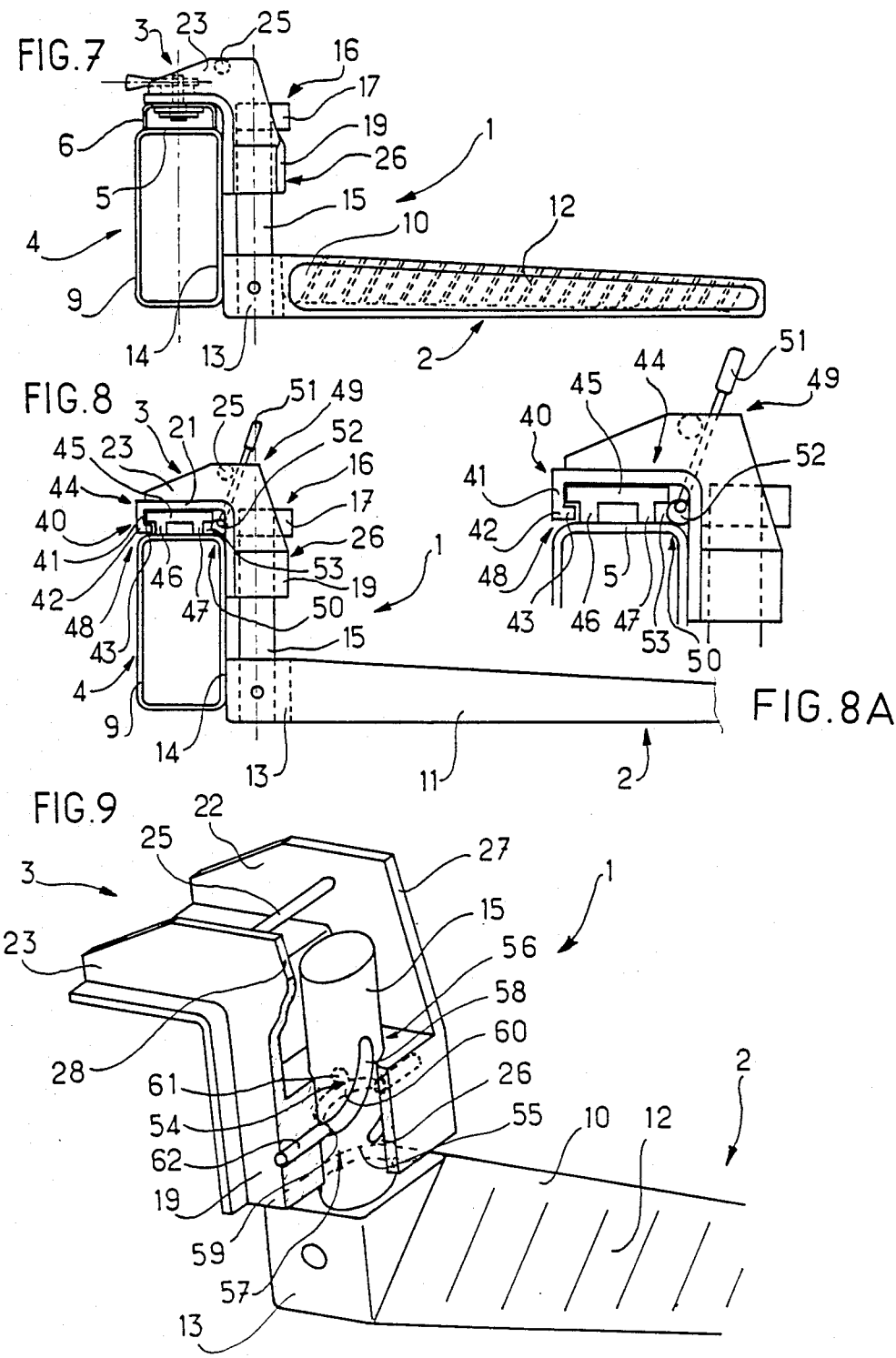

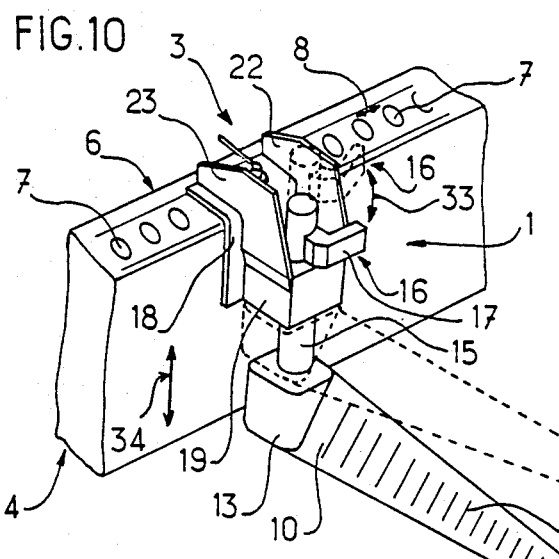
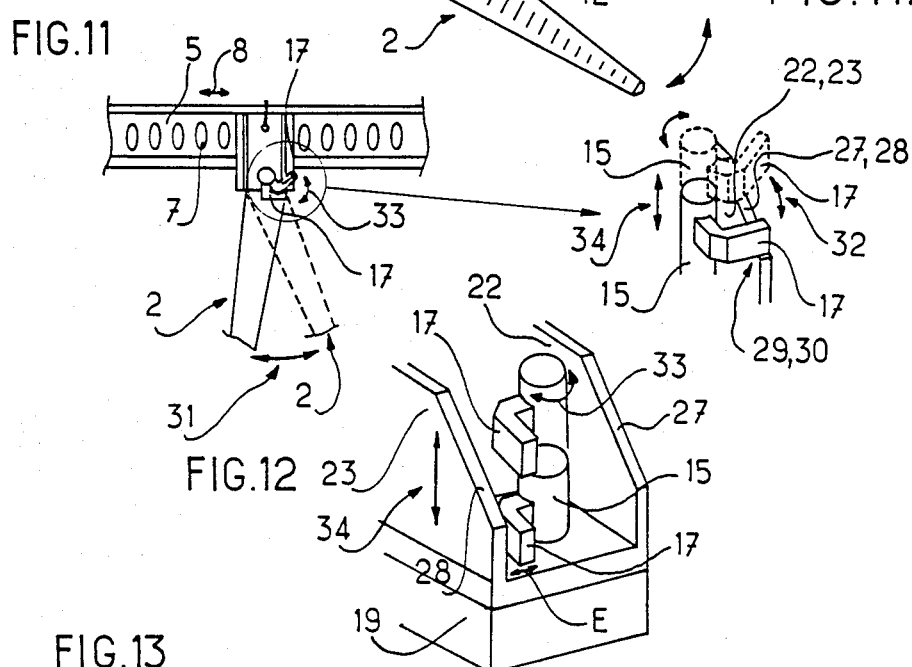
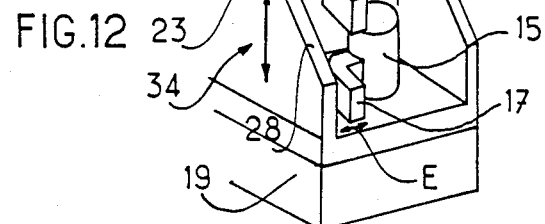
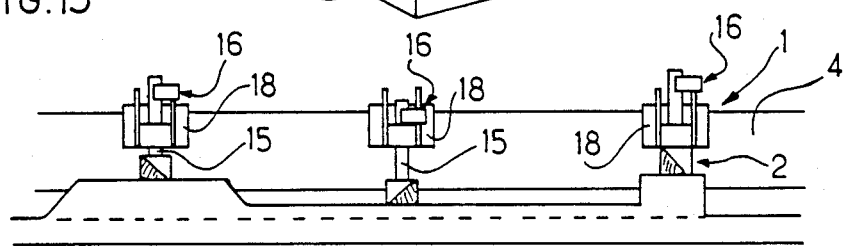

VEHICLE WHEEL SUPPORT AND FASTENING DEVICE

FIELD OF THE INVENTION

The present invention relates to a retractable element for restraining a vehicle by means of its wheels and capable of being used in pairs, especially upon car transporter vehicles.

BACKGROUND OF THE INVENTION

Because of its constitution and its general form as a single arm, the effective restraint of a wheel is achieved by means of the simultaneous use of two symmetrical arms arranged and locked in a slightly convergent configuration.

Support arms for use in pairs in order to restrain a vehicle by means of its wheels upon a car transporter vehicle are previously disclosed. These restraining elements include a support arm which is extended by means of a securing component which is designed to engage perforations defined within an engagement profile which is applied to the upper surface of the supporting profile, defining together with its corresponding arm a supporting plane.

The support arms of this type do not contain any moving components and are formed as a single piece in certain cases. They are accordingly unable to be folded back into an inoperative retracted position in order to free the loading area from obstruction. It is necessary to clear the loading area before proceeding to load or unload the cars. It is necessary, therefore, before loading and after unloading, to find and fit the support arm, or to remove them and stow them away. This means that their utilization involves considerable handling associated with their installation, removal and stowing away during the stages preceding loading and following unloading.

Thus, in view of the presence of components which require to be removed after use, it is necessary to provide storage space where they can be kept. This storage space requires a large amount of useful volume upon the carrying vehicle, which could be allocated to one or more other functions, in addition to which it imposes certain constraints associated with the coming and going to and from this storage space of the personnel assigned to this task for purposes of installation and stowing away of the restraint components.

Furthermore, these support elements do not offer all the possibilities of adjustment which are desirable for their rapid and convenient utilization.

SUMMARY OF THE INVENTION

The object of the present invention is to remedy these various disadvantages by proposing a retractable element for restraining a vehicle by means of its wheels with the help of a support arm and which is capable of being used in pairs, especially upon car transporter vehicles, characterized in that the support arm is mounted with a range of vertical movement between a high position and a low position and also be pivotably mounted within an engagement component between a folded-back inoperative position against the adjacent edge of the supporting profile and an extended working position situated substantially transversely to the supporting profile, with the operating supporting position being obtained automatically, from the extended working position by means of a self-adjusting pivoting movement in the direction of the tire of the wheel which is to be supported, which self-adjusting pivoting movement is restricted in an angular sense and is produced under the effect of the load by means of the vertical descending movement of the pivoting shaft into contact-producing movement upon a bearing surface in order to bring the arm into contact with the tire of the wheel which is to be supported.

The support arm perfected in accordance with the invention exhibits a number of advantages with respect to to the previously disclosed fixed arms. Since not all of these advantages can be mentioned here, we will content ourselves with listing the following principal advantages:

there is no longer any need to remove the arms after use, as they remain in place in their retracted positions;

they can be stored easily by arranging the arms so that they face toward the outside of the area defined by means of the supporting profiles, which permits the useful space of the loading area to be unobstructed.

the adjustment in the height and correspondingly in the orientation of the arm permits the pitch determined by means of the interval between the repetitive receiving structures provided upon or within the supporting profile to be defined. This adjustment affords complete freedom of sub-division, and thus a considerable degree of facility for bringing the arm into contact with the wheel to be restrained during loading, and for releasing it during unloading, by means of the automatic pivoting function associated with adjustment towards the definitive operating position;

increased safety resulting from the reaction force during pivoting bringing the two arms in the pair together through the action of the load by means of the arm and its pivoting shaft upon an inclined bearing surface;

the vertical deflection of the arm offers greater latitude of movement and thus complete freedom of positioning the supporting profile upon the loading plane;

locking of the arm at the retracted position.

BRIEF DESCRIPTION OF THE DRAWINGS

The invention will be better understood as a result of the following description, which relates to a mode of implementation given by means of a non-restrictive examples, in the case of two application examples which are explained with reference to the accompanying drawings, in which:

FIG. 1 is a perspective view of an individual restraining arm in accordance with the invention when disposed in the operating position;

FIG. 2 is a perspective view of an individual restraining arm in accordance with the invention at the retracted position;

FIG. 3 is a perspective view of a pair of restraining elements, in accordance with the preferred mode of execution, arranged close together and with slight compression when at their positions for restraining a wheel;

FIG. 4 is a perspective view of a pair of restraining elements in accordance with the invention and in conformity with the preferred mode at FIG. 3, in the retracted position against the adjacent edge of the supporting longitudinal member;

FIG. 5 is a perspective view representing the undersurface of the support plate containing the means of engagement and locking of the support bracket of each arm with respect to the supporting profile member;

FIG. 6 is a view in longitudinal section of the upper part of the supporting profile showing the penetration of the engagement and locking structures of FIG. 5 into the perforations of the securing profile;

FIG. 7 is a side elevational view of the restraining element in accordance with the invention engaged within the supporting profile;

FIG. 8 is a side elevational view of the restraining element in accordance with a variant, to be engaged in such a way as to be capable of sliding along a sliding profile when applied to the upper surface of the supporting profile, with an enlarged view of the upper engagement component being shown in FIG. 8A;

FIG. 9 is a diagrammatic view in perspective of another mode of execution of the present invention utilizing a cam profile upon the pivoting shaft;

FIG. 10 is a perspective view illustrating the end positions of the stop component and the supporting arm in the restraining configuration;

FIG. 11 is a diagrammatic plan view, together with an enlargement shown in FIG. 11A in perspective of the bearing surface, illustrating the manner in which the pitch may be divided as a result of the clearance of the stop component upon the inclined edge bearing surface;

FIG. 12 is a diagrammatic view in perspective illustrating the manner in which the stop component performs the locking function in the folded-back position; and FIG. 13 is a diagrammatic view illustrating the ability of the arm in accordance with the invention to adjust itself vertically in order to absorb any variations in height on the loading area.

DETAILED DESCRIPTION OF THE ILLUSTRATED EMBODIMENTS

The retractable support element in accordance with the invention originates from the general idea of the invention which involves implementing a supporting arm which is capable of being folded back to a position at which it is retracted by means of a pivotable movement and which is capable of vertical movement between a low position and a high position. The arm, supported by means of an engagement structure, is capable of attaching itself to a supporting profile at intervals determined by means of the pinch of the receiving structures. The arm is capable of vertical movement in relation to the horizontal supporting profile between two end positions, and of pivoting between a retracted inoperative position and an operative position perpendicular to the supporting profile, which position is adopted automatically by means of the arm under the effect of the load.

The operating position is made adjustable by means of a mechanical function between the engagement component supporting the pivoting shaft and the pivoting shaft.

Described below are the essential means of the invention and a number of direct variants, although it is obviously intended that various derived forms of implementation should fall within its scope.

Generally speaking, the retractable restraining element 1 constructed in accordance with the invention consists of a horizontal supporting arm 2 having operatively associated therewith a vertically upwardly extending engagement structure 3 for the purpose of its movable assembly upon a rectilinear support, for example a profile 4 which may be a longitudinal member, a solid or hollow metal beam, or any other similar structure, having applied to its upper face 5 an engagement and locking profile 6 having transverse openings such as 7, for example of oblong form, repeated in a linear sequence at constant intervals 8, that is to say the minimum interval existing between two adjacent positions.

The same function and the same effects are achieved by means of the use of a hollow supporting profile 9, as shown in FIG. 4, the upper surface 5 of which should be perforated in an identical or similar fashion to that of the engagement and locking profile 6.

In the manner of the previous embodiments the supporting arm 2 preferably exhibits a generally prismatic form with two side surfaces 10, 11, each of which, or one or the other of which exhibits an appropriate relief, for example a series of inclined ridges or ribs 12 for mechanical reinforcement and for the immobilization of the tire mounted upon the wheel to be restrained.

In the versions shown here, the side surfaces 10, 11 exhibit different configurations ranging from a large oblique side surface with ribs in conjunction with an adjacent vertical and smooth side surface, to a configuration having two identical side surfaces, similarly ridged, and having an identical surface area, such that they are capable of being used equally as a right-hand or as a left-hand component in the customary case of utilization in pairs.

For reasons of convenience, the majority of the variants shown here have one inclined ribbed side surface 10 and one vertical smooth side surface 11. The extent of the protection naturally extends to all the variants, irrespective of the configuration of the side surfaces and the form of their surfaces.

The supporting arm 2 is provided at its end closest to the supporting profile 4 and a heel 13, the rear surface of which is intended to come into contact with the adjacent edge 14 of the supporting profile 4.

The horizontal supporting arm 2 is pivotally connected to the engagement structure 3, which supports it by means of a vertical pivoting and translation shaft 15 so arranged as to be free to rotate at the base of the engagement structure and to be capable of vertical movement between a high position and a low position.

The pivoting shaft 15 provided with, within the vicinity of its upper end a transversely extending stop component 16, the multiple function of which is described below.

The stop component 16 comprises, for example, a substantially L-shaped lug, such as 17, disposed transversely with respect to the shaft 15, and of a specific thickness "E", as shown in FIG. 12, enabling locking to be effected in the folded-back position, as will be appreciated below.

The stop component is angularly off-set with respect to the arm by an amount enabling initial and final operating positions to be achieved toward either side of a median position perpendicular to the supporting profile.

The engagement structure 3 is formed by means of angle bracket 18 consisting of a base 19 providing connection to the supporting arm 2, a support plate 20 bent so as to have the configuration of a right-angle so as to fit precisely the adjacent lateral edge 14 of the supporting profile 4 and its upper surface 5, irrespective of whether it is fitted with an engagement and locking profile 6, and an upper component in the form of a horizontal engagement and locking plate 21 constituting the horizontally disposed leg of the support plate 20 disposed upon the upper face 5 of the profile 4. The support plate 20 exhibits two parallel strengthening wings 22 and 23 arranged perpendicularly to the two planes of the angle bracket 18. These two wings are joined together at their base by means of a bracing plate 24 connected to the joining base 19. They are joined together at their upper part by means of a bar acting as a handle 25.

The engagement structure 3 may, of course, be formed as a single piece by casting or in accordance with various other particular methods of construction.

The joining base 19 and the bracing plate 24 are penetrated by means of a central bore 26 acting as a guide bearing during pivoting and translation for the pivoting and translation shaft 15, with the fit between these components being loose in order to permit the easy sliding of the shaft 15, both in its pivoting movements and in its vertical translation movements in a plane parallel to the adjacent lateral edge 14 of the supporting profile 4.

The wings 22 and 23 each exhibit, at the front part of the engagement structure 3, an inclined rectilinear edge, respectively 27 and 28, as best seen in FIGS. 9, 11A, and 12, forming an inclined thrust plane 29 and 30 for the stop component 16, which produce angular deflection, to which the reference 31 has been given, during the downward movement of the pivoting and translation shaft 15 corresponding to the path 32 of the stop component 16 in the course of angular deflection 33 along one or the other of the thrust plates 29 or 30 following the total vertical displacement 34 of the arm. An automatic angular adjustment is thus provided towards the wheel which is to be restrained, caused by means of the descent of the arm under the effect of the load to be supported.

The angle bracket 18 is terminated at the top portion thereof by means of the horizontal engagement and locking plate 21, which exhibits upon its undersurface engagement and locking means 35 which interact with the perforations or openings 7 defined within the engagement and locking profile 6 or defined within the supporting profile 4, for the purpose of first restraining and then locking.

The engagement and locking means 35 comprise, for example, a series of pins having a form adapted to that of the perforations or openings 7. The means 35 comprises two fixed oblong pins 36 and 37 separated by means of a central pivoting pin 38, the movement of which is controlled by a means of locking lever 39 between an unlocked position in which the central pin lies parallel with the fixed pins and a locked position in which it lies perpendicular to these pins and the large dimension of the openings or perforations 7. The oblong pins 36, 37 and 38 are inserted within the openings or perforations 7 and block movement of the arm assemblies in the longitudinal sense along the profile members 4. The central pin 38 provides a locking function by engaging the under surface of the plate 21 and either the upper part of the engagement and locking profile 6, or the upper surface 5 of the supporting profile 4.

The body of each one of the oblong pins 36, 37 and 38 in fact exhibits a flat, projecting rear surface, defining together with the under surface of the plate 21 a distance slightly greater than the thickness of the engagement and locking profile 6, enabling blocking of insertion of the pins 36, 37, 38 within the apertures 7.

The present invention is not restricted only to the engagement and locking means described above.

It is possible to envisage, as shown in FIG. 8, engagement by means of a terminal edge 40 of the plate 21 of the angle bracket 18, the construction of which should be as an engagement flange 41, for example curved back in the form of a hook 42 with a return 43 at a right angle thereto, and so adapted as to engage with an engagement and sliding profile 44 mounted upon the upper edge 5 of the supporting profile 4, as illustrated in FIG. 8.

The engagement profile may be formed from a plate 45 attached to the upper surface of the supporting profile by means of a double leg arrangement with two projecting ribs 46 and 47 enabling a recessed space 48 and a raised edge to be defined thereby, upon and within which the engagement flange 41 engages.

The construction permits the restraining element in accordance with the invention to be engaged. It also permits, due to the loose mechanical fit defined between the support plate and its engagement support, sliding to take place along the profile 44.

For this reason the supporting arm can be longitudinally blocked upon the profile at any point by clamping or blocking, for example by means of a pinch lock 49 formed, for example, from an eccentric device 50 controlled by means of a lever 51, the roller 52 of which acts by thrust and clamping upon the opposite edge 53 of the engagement profile 45, as seen in FIG. 8A.

The major advantage of these modes of realization concerns the rapid immobilization of the mounting bracket assemblies 3 at any point upon the supporting profile. Since they also possess the self-adjusting function in the final operating position at a sufficient angular deflection, these variants afford an exceptional facility for utilization.

Another variant which utilizes the basic principle of the invention is shown in FIG. 9.

According to this variant, the angular deviation for self-adjustment and the pivoting of the support arms 2 to a retracted position are obtained by means of a recessed cam profile 54 defined upon the lateral surface 55 of the cylinder 56 constituting the pivoting shaft 15.

Illustrated more specifically in FIG. 9 is a recessed profile in the form of a groove 57, the path of which comprises an upper, quasi-vertical part 58 slightly inwardly curved and extending upwards and being joined by means of a deviation zone 59 to a second part in accordance with a circular groove 60 developed upon and around the lateral surface 55 of the cylinder 56 forming the pivoting shaft 15 according to a circle defined within a horizontal plane.

This circular groove exhibits, starting from the deviation zone 59, at a distance of approximately one quarter of a circle, a transverse slot 61 enabling it to be blocked at the retracted position. The path of the cam profile 54 corresponds to a retracted state of the arm assembly 2 when disposed in the high position.

The retracted state in the low position is, of course, obtained with a circular groove 60 situated within the upper part of the cylinder.

The cylinder 56 is maintained vertical by means of at least one fixed transversely disposed guide finger 62, the extremity of which is inserted into the groove 57 of the cam profile, which acts as a guide for it and imposes the vertical and pivoting movements upon the supporting arm.

This variant constitutes a perfect equivalent of the preceding variants, and in particular of the basic variant, since the means satisfy identical functions with the aim of achieving identical results. Thus, on the one hand, retraction by pivoting the arms 2 into the low position and locking of the same is achieved in an identical fashion, and, on the other hand, self-adjusting pivoting by descent of the arm is attained in the same way.

More generally, and in the same spirit, the pivoting of the arm about the shaft 15, which shaft is made stationary, can be achieved equally well in accordance with other modes of execution and other variants.

For the purposes of locking the arms in the low, retracted position in which they are moved against the adjacent lateral edge of the supporting profile, a thickness "E" of stop 16 (FIG. 12) is provided, such that this occupies the entire available distance defined between the pivoting shaft 15 and the adjacent flank of the corresponding wing. It is thus possible to block the stop against the flank of the adjacent wing, in this way locking the arm in its lower, retracted position. For the purposes of unlocking the arm, all that is necessary is to raise it vertically. The stop is disengaged from its housed position defined between the shaft and the flank of the wing as a result of the disengagement of the bearing surface, thereby making the arm free to rotate, as shown in FIG. 12.

The purpose of FIG. 13 is to illustrate the important advantage in connection with the restraining element in accordance with the invention of providing a certain range of vertical movement enabling the position of the supporting arm to be automatically adapted to the various irregularities and projections which may be present in the loading area and which may, in the case of one or more of them, be situated vertically in line with one or more of the restraining elements in accordance with the invention.

As indicated above, the restraining elements in accordance with the invention are required to be used in pairs. In these pairs it is possible to distinguish the elements by referring to the same as "right-hand" elements, that is to say those which are used on the right-hand side and in which the stop component 16 must face towards the right, and those elements referred to as "left-hand" elements, that is to say those which are used on the left-hand side and in which the stop component 16 must face towards the left.

The operating function and the utilization of the different modes of execution of the invention have now been described, together with the manner in which the vertical and horizontal forces and the corresponding torque loads are accommodated.

Each restraining element is so arranged as to be presented perpendicularly to the supporting profile 4, whereupon it is positioned in the most appropriate location by forcing its square plate against the corresponding edges of the profile 4 and by the simultaneous engagement of the pins 36, 37 and 38 within the corresponding openings or perforations 7, followed by locking of the same by actuating the handle 39 controlling the locking structures.

In the case of the sliding variants, each restraining element is engaged at the most appropriate point to either side of a wheel and in contact with the tire, whereupon it is locked in position by actuating the handle of the eccentric lock.

The effect of the load upon each supporting arm causes the supporting arm to descend to its lowest position. In the course of this movement, the arm will pivot slightly towards the tire as a result of the engagement of the sliding stop towards the bottom of its movement path along the inclined thrust plane with which it is in contact. The angular self-adjustment movement, which involves bringing the arms closer together one towards the other in an angular fashion in the sense of compression, affords greater security and greater effectiveness of the restraint. The tire is also truly immobilized against the stops, whereby it is engaged by the two arms of the pair which are forced together one towards the other.

The different forces to which the restraining element in accordance with the invention is subjected are as follows:

forces corresponding to the load, which are resolved upon the inclined thrust plane of the supporting arm into a vertical force and a horizontal force; and horizontal, longitudinal and lateral forces originting from the various dynamic forces, such as, for example, braking, acceleration, centrifugal force during turning, rolling, pitching and rocking movements.

These different forces are absorbed by means of the engagement arrangement, and the thrust against the supporting profile is absorbed by means of the support plate, the arm and its shaft and the reaction of the stop component upon its bearing surface.

The present invention is not, of course, restricted only to the means described above in detail, and various modifications without inventive contribution remain possible without departing from the scope of the present protection.

I claim:

1. A system for restraining a vehicle by its wheels, comprising:
    stationary support structure;
    at least one bracket adjustably movable along said support structure;
    means defined between said at least one bracket and said support structure for locking said at least one bracket at a predetermined position along said support structure;
    a restraining arm pivotably mounted upon said at least one bracket about an axis between a first storage position and a second operative position at which said restraining arm engages one of said vehicle wheels; and
    means integrally mounted upon said restraining arm for engaging said at least one bracket so as to limit the pivotal movement of said restraining arm from said storage position to said operative restraining position such that said restraining arm engages said vehicle wheel at said operative restraining position.

2. A system as set forth in claim 1, wherein:
    said at least one bracket comprises a pair of brackets spaced longitudinally along said stationary support structure for respectively mounting a pair of restraining arms for respectively engaging opposite side surfaces of said one of said vehicle wheels.

3. A system as set forth in claim 1, wherein:
    said restraining arm is disposed substantially parallel to said stationary support structure when disposed at said first storage position, and is disposed substantially perpendicular to said stationary support structure when disposed at said second operative position.

4. A system as set forth in claim 1, wherein:
    said restraining arm comprises a horizontally extending arm having a free end portion for engaging one surface of said one of said vehicle wheels, and an upstanding pivot shaft mounted upon an opposite end of said restraining arm and pivotably mounted within said at least one bracket; and said integrally mounted means comprises a substantially L-shaped stopper lug integrally attached to an upper portion of said upstanding pivot shaft for engaging a sidewall portion of said at least one bracket so as to limit the pivotal movement of said restraining arm so as to define said operative restraining position of said restraining arm.

5. A system as set forth in claim 1, wherein:
said restraining arm has a predetermined longitudinal extent and a substantially triangular configuration in cross-section within a plane transverse to said longitudinal extent of said restraining arm.

6. A system as set forth in claim 5, wherein:
said restraining arm having said substantially triangular configuration in transverse cross-section includes an inclined surface for engaging a peripheral surface portion of said vehicle wheel tire.

7. A system as set forth in claim 1, wherein said means defined between said at least one bracket and said stationary support structure comprises:
a plurality of apertures defined within said stationary support structure in a longitudinal array with a predetermined amount of spacing defined between adjacent apertures; and
lug means defined upon said at least one bracket for engagement within said plurality of apertures.

8. A system as set forth in claim 7, wherein said lug means comprises:
at least one lug fixedly mounted upon said at least one bracket for engagement within at least one of said apertures of said stationary support structure; and
at least one lug pivotably mounted upon said at least one bracket for insertion within at least one of said apertures of said stationary support structure when said at least one pivotable lug is disposed at a first position, and for locking said at least one bracket upon said stationary support structure when said at least one pivotable lug is disposed at a second pivotable position.

9. A system as set forth in claim 8, further comprising:
handle means fixedly connected to said at least one pivotably mounted lug for rotatably moving said at least one pivotably mounted lug between said first insertion and second locking positions.

10. A system as set forth in claim 1, wherein said means defined between said at least one bracket and said support structure comprises:
rail means fixedly secured to said stationary support structure;
hook means formed upon said at least one bracket for engaging one side edge portion of said rail means; and
pivotably movable eccentric locking means mounted upon said at least one bracket for engaging an opposite side edge portion of said rail means.

11. A system set forth in claim 10, wherein said eccentric locking means comprises:
a pivotable axis defined upon said at least one bracket;
an engagement roller eccentrically mounted upon said axis of said at least one bracket; and
handle means connected to said engagement roller for pivotably moving said eccentric roller between engagement and release positions relative to said opposite side edge portion of said rail means.

12. A system as set forth in claim 4, wherein:
said restraining arm, including said horizontally extending arm, said upstanding pivot shaft, and said stopper lug, is vertically movable relative to said at least one bracket.

13. A system as set forth in claim 2, wherein:
each of said brackets includes inclined surface portions for engaging said integrally mounted means of said restraining arms such that when said integrally mounted means engage said inclined surface portions of said brackets, said restraining arms will be disposed in convergent positions with respect to each other so as to engage opposite side surfaces of said one of said vehicle wheels in said relative convergent mode.

14. A system as set forth in claim 4, wherein:
said at least one bracket comprises a pair of brackets spaced longitudinally along said stationary support structure for respectively mounting a pair of restraining arms for respectively engaging opposite side surfaces of said one of said vehicle wheels;
each of said restraining arms, including said horizontally extending arms, said upstanding pivot shafts, and said stopper lugs, are vertically movable relative to said respective brackets; and
each of said brackets includes inclined surface portions for engaging said stopper lugs of said restraining arms such that when said stopper lugs engage said inclined surface portions of said brackets under vertical weight load conditions of said vehicle being supported upon said restraining arms, said restraining arms will move vertically downwardly relative to said respective brackets such that said engagement of said stopper lugs with said inclined surface portions causes said restraining arms to move in a convergent manner toward each other so as to engage said opposite side surfaces of said one of said vehicle wheels under said convergent conditions.

* * * * *